United States Patent
Park et al.

(10) Patent No.: US 6,185,087 B1
(45) Date of Patent: Feb. 6, 2001

(54) MULTILAYER CERAMIC CHIP CAPACITOR WITH HIGH RELIABILITY COMPATIBLE WITH NICKEL ELECTRODES

(75) Inventors: Hyun D. Park, Greer; Joseph D. Nance, Central, both of SC (US); Mike S. H. Chu, Lewiston, NY (US); Yuval Avniel, Longmont, CO (US)

(73) Assignees: Kemet Electronics Corp., Greenville, SC (US); Ferro Electronic Materials Inc., Niagara Falls, NY (US)

(*) Notice: Under 35 U.S.C. 154(b), the term of this patent shall be extended for 0 days.

(21) Appl. No.: 09/288,079

(22) Filed: Apr. 8, 1999

(51) Int. Cl.$^7$ ............... H01G 4/06; H01G 4/12; C04B 35/46

(52) U.S. Cl. ............... 361/321.4; 361/321.5; 361/322; 501/134; 501/137

(58) Field of Search ............... 361/311–313, 326, 361/321.2, 321.3, 321.4, 321.5, 322, 301.4; 257/295, 296, 310, 306; 29/25.41, 25.42; 501/134–139; 252/62.2

(56) References Cited

U.S. PATENT DOCUMENTS

| | | | |
|---|---|---|---|
| 5,010,443 | 4/1991 | Maher | 361/321.4 |
| 5,097,391 | 3/1992 | Nomura et al. | 361/321.4 |
| 5,117,326 | 5/1992 | Sano et al. | 361/321.4 |
| 5,319,517 | 6/1994 | Nomura et al. | 361/321.4 |
| 5,335,139 | 8/1994 | Nomura et al. | 361/321.4 |
| 5,668,694 | * 9/1997 | Sato et al. | 361/321.4 |

* cited by examiner

Primary Examiner—Anthony Dinkins
(74) Attorney, Agent, or Firm—Banner & Witcoff, Ltd.

(57) ABSTRACT

Multilayer ceramic chip capacitors which satisfy X7R requirements and which are compatible with reducing atmosphere sintering conditions so that non-noble metals such as nickel, copper, and alloys thereof may be used for internal and external electrodes are made in accordance with the invention. The capacitors exhibit desirable dielectric properties (high capacitance, low dissipation factor, high insulation resistance), excellent performance on highly accelerated life testing, and very good resistance to dielectric breakdown. The dielectric layers preferably contain $BaTiO_3$ as the major component and $CaTiO_3$, BaO, CaO, SrO, $SiO_2$, $MnO_2$, $Y_2O_3$, and CoO as minor components in such proportions so that there are present 0.1 to 4 mol % $CaTiO_3$, 0.1 to 2 mol % BaO, 0 to 1 mol % CaO, 0 to 1 mol % SrO, 0.1 to 5 mol % $SiO_2$, 0.01 to 2 mol % MnO2, 0.1 to 3 mol % $Y_2O_3$, and 0.01 to 1 mol % CoO. The preferred form of the invention may be sintered in the temperature range 1,250 to 1,400° C. in a reducing atmosphere having a humidified mixture of nitrogen and hydrogen. Additionally, a re-oxidation procedure may be utilized during the sintering cycle to optimize the resistance of the ceramic to dielectric breakdown.

12 Claims, 1 Drawing Sheet

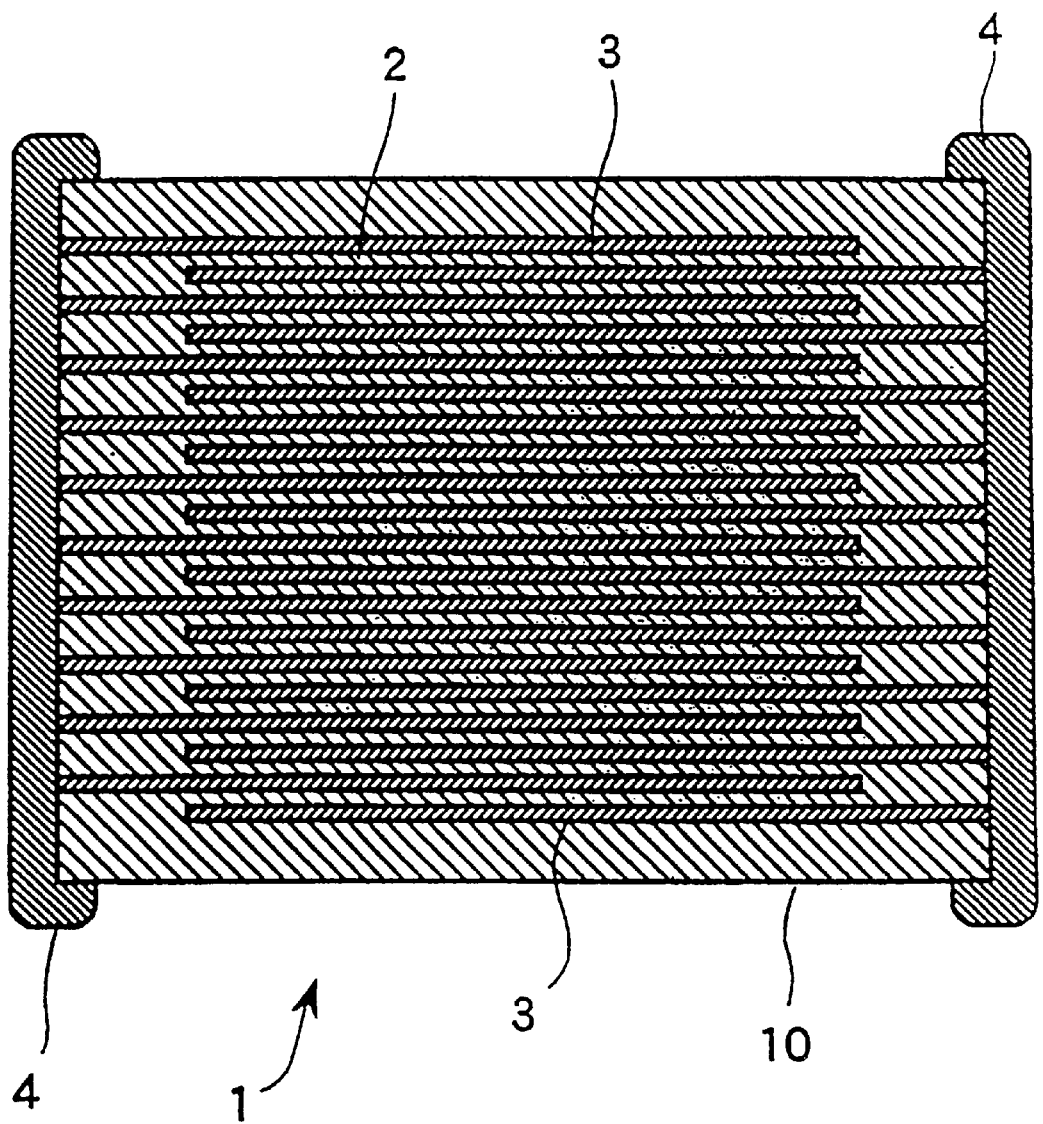

US 6,185,087 B1

MULTILAYER CERAMIC CHIP CAPACITOR WITH HIGH RELIABILITY COMPATIBLE WITH NICKEL ELECTRODES

FIELD OF THE INVENTION

This invention relates to multilayer ceramic chip capacitors, and more particularly to a barium titanate-based dielectric composition which can be used to produce capacitors compatible with base metal electrodes such as nickel or nickel alloys.

BACKGROUND OF THE INVENTION

Multilayer ceramic chip capacitors have been widely utilized as miniature size, high capacitance, high reliability electronic parts. In accordance with increasing demands for smaller, high-performance electronic equipment, multilayer ceramic chip capacitors also have encountered more rigorous demand toward smaller size, higher capacitance, lower cost, and higher reliability.

Multilayer ceramic chip capacitors generally are fabricated by forming alternating layers of an internal electrode-forming paste and a dielectric layer-formiing paste. Such layers may be formed by sheeting, printing, and similar techniques followed by concurrent firing.

Generally, the internal electrodes have been formed of conductors such as Pd and Pd alloys. Although palladium is expensive, it can be partially replaced by the use of relatively inexpensive base metals such as Ni and Ni alloys. The term "base metal" is defined as any metal other than a metal of the precious metal groups (gold, silver, and platinum). Since internal electrodes of base metals become oxidized if fired in ambient air, the dielectric layers and internal electrode layers must be co-fired in a reducing atmosphere. Firing in a reducing atmosphere, however, causes the dielectric layers to be reduced, resulting in a lowering of resistivity. Multilayer ceramic chip capacitors using non-reducible dielectric materials have been proposed; however, such devices typically have a shorter life of insulation resistance (IR) and low reliability.

When the dielectric material is subject to a DC electric field, its relative dielectric constant (K) lowers with time. If thinner dielectric layers are used in order to provide chip capacitors of a smaller size and greater capacitance, application of DC voltages across the capacitor causes the dielectric layers to receive a more intense electric field, resulting in a greater change of dielectric constant (K) with time, that is, a greater change of capacitance with time. Such changes are undesirable in most applications.

Capacitors also are required to have good DC bias performance. The term "DC bias performance," also referred to as the voltage coefficient of capacitance (VCC), is defined as the rate of change of capacitance with a change in DC bias (voltage). The capacitance generally decreases as the applied DC electric field is increased. Capacitors having poor DC bias performance thus have the problem that when a DC electric field is applied across the capacitors during normal operation, capacitance drops to unacceptable levels.

The Electronic Industry Association (EIA) prescribes a standard for temperature coefficient of capacitance (TCC) known as the X7R characteristic. The X7R characteristic requires that the rate of change of capacitance be within ±15% (reference temperature 25° C.) over the temperature range −55° C. to 125° C.

U.S. Pat. No. 5,335,139 to Nomura discusses various prior efforts. According to Nomura, one dielectric material known to meet the X7R characteristic is a composition of the $BaTiO_3+SrTiO_3+MnO$ system described in Japanese Patent Application Kokai (JP-A) No. 36170/1986. This material, however, is said to experience a great change of capacitance with time under a DC electric field, for example, a capacitance change of −10% to −30% when a DC electric field of 50 volts is applied at 40° C. for 1,000 hours. This change fails to meet the X7R characteristic.

Other non-reducible dielectric porcelain compositions discussed by Nomura include the BaTiO3+MnO+MgO system described in JP-A 71866/1982; the $(Ba_{1-x}Sr_xO)_aTi_{1-y}Zr_yO_2+\alpha((1-x)MnO+zCoO)+\beta((1-t)A_2O_5+tL_2O_3+wSiO_2$ system disclosed in JP-A 250905/1986, wherein A is Nb, Ta, or V, and L is Y or a rare earth element; and barium titanate having added thereto $Ba_aCa_{1-a}SiO_3$ in vitreous state as disclosed in JP-A 83256/1990. It is said that these dielectric porcelain compositions could not meet all the requirements including good temperature dependence of capacitance, a minimized change of capacitance with time under a DC electric field, good DC bias performance, and a long accelerated life of insulation resistance. For example, the compositions of JP-A 250905/1986 and 83256/1990 are said to have a short accelerated life of insulation resistance.

Nomura, U.S. Pat. No. 5,335,139, describes a multilayer ceramic chip capacitor having alternately stacked dielectric layers and internal electrode layers which may be formed of nickel or nickel alloy. In one embodiment, the dielectric layers contain barium titanate as a major component and magnesium oxide, manganese oxide, barium oxide and/or calcium oxide, silicon dioxide, and yttrium oxide as minor components in such proportion that there are present 0.1 to 3 mol of MgO, 0.05 to 1.0 mol of MnO, 2 to 12 mol of BaO+CaO, 2 to 12 mol of $SiO_2$ and up to 1 mol of $Y_2O_3$ per 100 mol of $BaTiO_3$. Nomura teaches that samples containing less than 0.1 mol magnesium oxide per 100 mol of $BaTiO_3$ fail to provide the desired temperature dependence of capacitance.

It is desirable to have yttrium oxide present in the ceramic composition to ensure high reliability, provide high resistance to dielectric breakdown, and prevent degradation. However, when yttrium oxide and magnesium oxide are both present in the composition, they tend to interact in a manner which causes the rate of change of capacitance to fall outside of the X7R characteristic at the high end of the temperature range, i.e., 125° C. It would thus be desirable to develop a composition which contains yttrium oxide but no magnesium oxide in order to form capacitors having high reliability and high resistance to DC voltage breakdown while meeting the X7R characteristic at 125° C.

SUMMARY OF THE INVENTION

It is an object of the present invention to provide a barium titanate-based dielectric composition which can be used to produce capacitors compatible with base metals such as nickel and nickel alloys as the internal electrode material.

It is another object of the present invention to provide a composition which can be utilized in the manufacture of ceramic multilayer chip capacitors that exhibit excellent reliability and resistance to dielectric breakdown under highly accelerated life testing conditions.

It is yet another object of the present invention to provide a ceramic dielectric material which can be fabricated into multilayer capacitors with nickel or nickel alloy internal electrodes, which capacitors exhibit a change of capacitance with temperature that meets the EIA X7R characteristic within the temperature range of −55° C. to +125° C.

According to the present invention, a multilayer ceramic chip capacitor comprises alternately stacked dielectric layers and internal electrode layers, wherein the dielectric layers comprise:

$BaTiO_3$: 94 to 99 mol %;
$CaTiO_3$: 0.1 to 4 mol %;
BaO: 0.1 to 2 mol %;
CaO: 0 to 1 mol %;
SrO: 0 to 1 mol %;
$SiO_2$: 0.1 to 5 mol %;
$MnO_2$ 0.01 to 2 mol %;
$Y_2O_3$: 0.1 to 3 mol %; and
CoO: 0.01 to 1 mol %;

wherein the dielectric layers are substantially free of magnesium oxide. The internal electrode layers preferably are formed of nickel or nickel alloy.

Preferably, the multilayer ceramic chip capacitor is fabricated by alternately stacking dielectric layers and internal electrodes to form a green chip, firing the green chip in a reducing atmosphere of nitrogen, hydrogen, and water vapor at a temperature of 1,250° C. to 1,400° C, optionally annealing in an atmosphere having an oxygen partial pressure of at least $10^{-6}$ atm. and at a temperature of up to 1,100° C. to optimize the resistance of the ceramic to dielectric breakdown, and attaching external electrodes.

It has been found that the multilayer ceramic capacitors of the present invention, which do not require the presence of magnesium oxide, exhibit very good performance in highly accelerated life testing as well as very high resistance to dielectric breakdown in an applied DC field. Under the highly stressed conditions consisting of application of a DC voltage between 8 and 14 times the rated voltage of the ceramic at 140° C. for a period of up to 60 hours, the ceramic capacitors maintain high insulation resistance and do not exhibit dielectric breakdown. The dielectric composition when fired has a dielectric constant (K) of at least 2,500 at 25° C. and a dissipation factor (DF) of less than 3.5% (measured at 1 volt RMS) at 25° C. The capacitors may be formed with nickel or nickel alloy internal electrodes, and exhibit a change in capacitance with temperature of no more than 15% over the temperature range of –55° C. to +125° C. as compared to the value at 25° C.

BRIEF DESCRIPTION OF THE DRAWING

The FIGURE is an elevational cross-sectional view of a multilayer ceramic chip capacitor according to a preferred embodiment of the invention.

DETAILED DESCRIPTION OF THE INVENTION

The configuration of ceramic multilayer capacitors is well known in the art. With reference to the FIGURE, an exemplary structure of a multilayer ceramic chip capacitor 1 is shown. External electrodes 4 of the capacitor 1 are disposed on side surfaces of the capacitor chip 10 and in electrical connection to internal electrode layers 3. The capacitor chip 10 has a plurality of alternately stacked dielectric layers 2. The shape of the capacitor chip 10 is not critical although it is often rectangular shaped. Also, the size is not critical and the chip may have appropriate dimensions in accordance with a particular application, typically in the range of 1.0 to 5.6 mm x 0.5 to 5.0 mm x 0.5 to 1.9 mm. The internal electrode layers 3 are stacked such that at opposite ends they are alternately exposed at opposite side surfaces of the chip 10 That is, the internal electrode layers 3 of one group are exposed at one side surface of the chip 10 and the internal electrode layers 3 of another group are exposed at the opposite side surface of the chip 10 One external electrode 4 is applied to one side chip of the capacitor chip 10 in electrical contact with the internal electrode layers 3 of the one group, and the other external electrode 4 is applied to the opposite side surface of the chip 10 in electrical contact with the internal electrode layers 3 of the other group. A desired capacitor circuit is completed in this way.

The dielectric layers are formed of a dielectric material containing barium titanate as a major component and calcium titanate, barium oxide or a precursor thereof, calcium oxide or a precursor thereof, strontium oxide or a precursor thereof, silicon dioxide or a precursor thereof, manganese dioxide or a precursor thereof, yttrium oxide or a precursor thereof, and cobalt oxide or a precursor thereof as minor components. These components are contained in such a proportion that there are present:

$BaTiO_3$: 94 to 99 mol %, preferably 95 to 97 mol %;
$CaTiO_3$: 0.1 to 4 mol %, preferably 1 to 3 mol %;
BaO: 0.1 to 2 mol %, preferably 0.25 to 1.25 mol %;
CaO: 0 to 1 mol %, preferably 0.01 to 0.5 mol %;
SrO: 0 to 1 mol %; preferably 0 to 0.5 mol %;
$SiO_2$: 0.1 to 5 mol %, preferably 1 to 3 mol %;
$MnO_2$: 0.01 to 2 mol %, preferably 0.05 to 0.5 mol %;
$Y_2O_3$: 0.1 to 3 mol %, preferably 0.2 to 2 mol %; and
CoO: 0.01 to 1 mol %, preferably 0.03 to 0.25 mol %.

As will be understood by those skilled in the art, "precursor" is defined as including carbonates, hydroxides, oxalates, acetates, etc.

A portion of the BaO and $CaTiO_3$, most of the CaO, and all of the $SiO_2$ are present in the composition in the form of a glass flux which improves densification of the ceramic. The molar ratio of $(BaO+CaO)/SiO_2$ or $(BaO+CaO)/TiO_2$ is not critical, but generally ranges from about 0.9 to 1.1. BaO, CaO, and $SiO_2$ or $TiO_2$ may be contained in the composite oxide form of $(Ba_xCa_{1-x}O)_y SiO_2$ or $(Ba_xCa_{1-x}O)_y TiO_2$ wherein letters x and y are $0.3 \leq x \leq 0.7$ and $0.95 \leq y \leq 1.05$ in order for a sintered body to be dense. Preferably $(Ba_xCa_{1-x}O)_y SiO_2$ or $(Ba_xCa_{1-x}O)_y TiO_2$ is contained in an amount of 1 to 10%, especially 4 to 6% by weight, based on the total weight of $BaTiO_3$, $MnO_2$, $Y_2O_3$, and CoO. The oxidation state of each oxide is not critical insofar as the contents of metal elements constituting the respective oxides are within the above-identified ranges.

Any desired compound may be contained in the dielectric material, although it is preferred that the material be substantially free of magnesium oxide so that the temperature coefficient of capacitance (TCC) at 125° C. will be within X7R limits. The presence of magnesium oxide or a precursor thereof to the preferred composition would depress the TCC at 125° C. to a value outside of X7R limits.

Described below are the reasons for the limitation of the contents of the respective minor components.

Yttrium oxide is effective for improving the accelerated life of IR and DC bias performance. The DC bias performance becomes poor with yttrium oxide contents of 0.1 mol or less on the above-identified basis. Yttrium oxide contents above the above-identified range result in a reduced dielectric constant and can detract from sinterability, leading to less densification.

Contents of BaO and CoO below the above-identified ranges result in a greater change of capacitance with time upon application of a DC electric field, a shorter accelerated life of IR, and undesirable temperature dependence of capacitance. Larger contents of these components result in a shorter accelerated life of IR and a drastic lowering of dielectric constant. Contents of $SiO_2$ and $CaTiO_3$ below the above-identified range drastically detract from sinterability and thus lead to less densification, whereas larger contents beyond the range lead to a lowering of the initial insulation resistance.

Manganese dioxide is effective for densification of dielectric layers and improving an accelerated life of IR. With a content larger than the above-identified range, it is difficult to reduce a change of capacitance with time upon application of a DC electric field. To be fully effective, manganese dioxide should be contained in an amount of at least 0.01 mol on the same basis.

The dielectric layers may have any desired mean grain size. By limiting the dielectric material to the above-defined composition, there are obtained fine crystal grains which typically have a mean grain size of about 0.2 to 0.7 $\mu$m.

The dielectric layers have an appropriate Curie temperature which is determined in accordance with the applicable standards by suitably selecting a particular composition of dielectric material. Typically the Curie temperature is higher than 45° C., especially about 65° C. to 125° C.

Each dielectric layer preferably has a thickness of up to about 50 $\mu$m, more preferably up to about 20 $\mu$m. The lower limit of thickness is about 0.5 $\mu$m, preferably about 2 $\mu$m. The present invention is effectively applicable to multilayer ceramic chip capacitors having such thin dielectric layers for minimizing a change of their capacitance with time. The number of dielectric layers stacked is generally from 2 to about 300, preferably from 2 to about 200.

The conductor which forms the internal electrode layers 3 is not critical, although a base metal preferably is used since the dielectric material of the dielectric layers 2 has anti-reducing properties. Typical base metals are nickel and nickel alloys. Preferred nickel alloys are alloys of nickel with at least one member selected from Mn, Cr, Co, and Al, with such nickel alloys containing at least 95 wt% of nickel being more preferred. It is to be noted that nickel and nickel alloys may contain up to about 0.1 wt% of phosphorous and other trace components.

The thickness of the internal electrode layers may be suitably determined in accordance with a particular purpose and application although its upper limit is typically about 5 $\mu$m, preferably about 2.5 $\mu$m, and its lower limit is typically about 0.5 $\mu$m, preferably about 1 $\mu$m.

The conductor which forms the external electrodes 4 is not critical, although inexpensive metals such as nickel, copper, and alloys thereof are preferred. The thickness of the external electrodes may be suitably determined in accordance with a particular purpose and application although it generally ranges from about 10 $\mu$m to about 50 $\mu$m.

The multilayer ceramic chip capacitor of the present invention generally is fabricated by forming a green chip by conventional printing and sheeting methods using pastes, firing the chip, and printing or transferring external electrodes thereto followed by baking.

Paste for forming the dielectric layers can be obtained by mixing a raw dielectric material with an organic vehicle. The raw dielectric material may be a mixture of oxides and composite oxides as previously mentioned. Also usefwll are various compounds which convert to such oxides and composite oxides upon firing. These include, for example, carbonates, oxalates, nitrates, hydroxides, and organometallic compounds. The dielectric material is obtained by selecting appropriate species from these oxides and compounds and mixing them. The proportion of such compounds in the raw dielectric material is determined such that after firing, the specific dielectric layer composition may be met. The raw dielectric material is generally used in powder form having a mean particle size of about 0.1 to about 3 $\mu$m, preferably about 1 $\mu$m.

The organic vehicle is a binder in an organic solvent. The binder used herein is not critical and may be suitably selected from conventional binders such as ethyl cellulose. Also the organic solvent used herein is not critical and may be suitably selected from conventional organic solvents such as terpineol, butylcarbinol, acetone, and toluene in accordance with a particular application method such as a printing or sheeting method.

Paste for forming internal electrode layers is obtained by mixing an electro-conductive material with an organic vehicle. The conductive material used herein includes conductors such as conductive metals and alloys as mentioned above and various compounds which convert into such conductors upon firing, for example, oxides, organometallic compounds and resinates. The organic vehicle is as mentioned above.

Paste for forming external electrodes is prepared by the same method as the internal electrodes layer-forming paste.

No particular limit is imposed on the organic vehicle content of the respective pastes mentioned above. Often the paste contains about 1 to 5 wt % of the binder and about 10 to 50 wt % of the organic solvent. If desired, the respective pastes may contain any other additives such as dispersants, plasticizers, dielectric compounds, and insulating compounds. The total content of these additives is preferably up to about 10 wt %.

A green chip then may be prepared from the dielectric layer-forming paste and the internal electrode layer-forming paste. In the case of printing method, a green chip is prepared by alternately printing the pastes onto a substrate of polyethylene terephthalate (PET), for example, in laminar form, cutting the laminar stack to a predetermined shape and separating it from the substrate.

Also useful is a sheeting method wherein a green chip is prepared by forming green sheets from the dielectric layer-forming paste, printing the internal electrode layer-forming paste on the respective green sheets, and stacking the printed green sheets.

The binder is then removed from the green chip and fired. Binder removal may be carried out under conventional conditions, preferably under the following conditions where the internal electrode layers are formed of a base metal conductor such as nickel and nickel alloys.

Heating rate: 5 to 300° C./hour, more preferably 10 to 100° C./hour

Holding temperature: 200 to 400° C., more preferably 250 to 300° C

Holding time: ½ to 24 hours, more preferably 5 to 20 hours,

Atmosphere: air

The green chip is then fired in an atmosphere which may be determined in accordance with the type of conductor in the internal electrode layer-forming paste. Where the internal electrode layers are formed of a base metal conductor such as nickel and nickel alloys, the firing atmosphere may have an oxygen partial pressure of $10^{-8}$ to $10^{-12}$ atm. Extremely low oxygen partial pressure should be avoided, since at such low pressures the conductor can be abnormally sintered and may become disconnected from the dielectric layers. At oxygen partial pressures above the range, the internal electrode layers are likely to be oxidized.

For firing, the chip preferably is held at a temperature of 1,100° C. to 1,400° C., more preferably 1,250 to 1,400° C.

Lower holding temperatures below the range would provide insufficient densification whereas higher holding temperatures above the range can lead to poor DC bias performance. Remaining conditions for sintering preferably are as follows.

Heating rate: 50 to 500° C./hour, more preferably 200 to 300° C./hour

Holding time: ½ to 8 hours, more preferably 1 to 3 hours.

Cooling rate: 50 to 500° C./hour, more preferably 200 to 300° C./hour

The firing atmosphere preferably is a reducing atmosphere. An exemplary atmospheric gas is a humidified mixture of $N_2$ and $H_2$ gases.

Firing of the capacitor chip in a reducing atmosphere preferably is followed by annealing. Annealing is effective for re-oxidizing the dielectric layers, thereby optimizing the resistance of the ceramic to dielectric breakdown. The annealing atmosphere may have an oxygen partial pressure of at least $10^{-6}$ atm., preferably $10^{-5}$ to $10^{-4}$ atm. The dielectric layers are not sufficiently re-oxidized at a low oxygen partial pressures below the range, whereas the internal electrode layers are likely to be oxidized at oxygen partial pressures above this range.

For annealing, the chip preferably is held at a temperature of lower than 1,100° C., more preferably 500° C. to 1,000° C. Lower holding temperatures below the range would oxidize the dielectric layers to a lesser extent, thereby leading to a shorter life. Higher holding temperatures above the range can cause the internal electrode layers to be oxidized (leading to a reduced capacitance) and to react with the dielectric material (leading to a shorter life). Annealing can be accomplished simply by heating and cooling. In this case, the holding temperature is equal to the highest temperature on heating and the holding time is zero. Remaining conditions for annealing preferably are as follows.

Holding time: 0 to 20 hours, more preferably 6 to 10 hours.

Cooling rate: 50 to 500° C./hour, more preferably 100 to 300° C./hour

The preferred atmospheric gas for annealing is humid nitrogen gas.

The nitrogen gas or a gas mixture used in binder removal, firing, and annealing, may be humidified using a wetter. In this regard, water temperature preferably is about 5 to 75° C.

The binder removal, firing, and annealing may be carried out either continuously or separately. If done continuously, the process includes the steps of binder removal, changing only the atmosphere without cooling, raising the temperature to the firing temperature, holding the chip at that temperature for firing, lowering the temperature to the annealing temperature, changing the atmosphere at that temperature, and annealing.

If done separately, after binder removal and cooling down, the temperature of the chip is raised to the binder-removing temperature in dry or humid nitrogen gas. The atmosphere then is changed to a reducing one, and the temperature is further raised for firing. Thereafter, the temperature is lowered to the annealing temperature and the atmosphere is again changed to dry or humid nitrogen gas, and cooling is continued. Alternately, once cooled down, the temperature may be raised to the annealing temperature in a nitrogen gas atmosphere. The entire annealing step may be done in a humid nitrogen gas atmosphere.

The resulting chip may be polished at end faces by barrel tumbling and sand blasting, for example, before the external electrode-forming paste is printed or transferred and baked to form external electrodes. Firing of the external electrode-forming paste may be carried out under the following conditions: a humid mixture of nitrogen and hydrogen gases, about 600 to 800° C., and about 10 minutes to about 1 hour.

If necessary, pads are formed on the external electrodes by plating or other methods known in the art.

The multilayer ceramic chip capacitors of the invention can be mounted on printed circuit boards, for example, by soldering.

During operation of the multilayer ceramic chip capacitors of the invention, a DC electric field of at least 0.02 V/$\mu$m, often at least 0.2 V/$\mu$m, more often at least 0.5 V/$\mu$m, and generally up to about 5 V/$\mu$m is applied to the dielectric layers as well as an overlapping AC component. The capacitors exhibit a minimized change of their capacitance over time, even when such a DC electric field is applied.

EXAMPLE

The following example is provided to illustrate preferred aspects of the invention and is not intended to limit the scope of the invention.

A dielectric powder was prepared. A glass frit was first prepared by mixing the appropriate components from powders of $BaCO_3$, $CaCO_3$, $TiO_2$, and $SiO_2$, heat treating them at a temperature range from 900° C. to 1150° C., pulverizing, and then grinding them to a particle size of 0.5 micron to 1.0 micron. Those skilled in the art will appreciate that such a frit also can be prepared by mixing the above components, melting them in a platinum crucible, quenching the molten mixture in cold water, drying the melt, and then grinding the melt to a particle size of 0.5 to 1.0 micron. Grinding can be accomplished both dry, such as jet milling, or wet, such as ball milling and vibratory energy milling.

A raw dielectric material was prepared by mixing and blending components from powders of $BaTiO_3$, $CaTiO_3$, $BaCO_3$, $CaCO_3$, $MnCO_3$, CoO, and $Y_2O_3$, adding the appropriate amount of frit, as prepared above, and thenjet milling dry to a particle size of 0.5 to 1 micron. Milling also can be achieved wet via ball milling, vibratory energy milling, or any equivalent technology. By changing the mixing proportion of the respective powders, a powder was prepared having the composition:

| Component | $BaTiO_3$ | BaO | $TiO_2$ | CaO | $Y_2O_3$ | $SiO_2$ | $MnO_2$ | CoO |
|---|---|---|---|---|---|---|---|---|
| Weight % | 95.144 | 1.429 | 1.080 | 0.801 | 0.991 | 0.410 | 0.116 | 0.029 |

A paste was prepared by milling 100 parts of the raw dielectric material, 4.8 parts of an acrylic resin, 40 parts of methylene chloride, 20 parts of trichloroethane, 6 parts of mineral spirit, and 4 parts of acetone in a ball mill.

An internal electrode layer-forming paste was prepared by milling 100 parts of nickel particles having a mean particle size of 0.8 $\mu$m, 40 parts of an organic vehicle (obtained by dissolving 8 parts by weight of ethyl cellulose resin in 92 parts of butylcarbinol), and 10 parts of butylcarbinol in a three-roll mill.

An external electrode-forming paste was prepared by milling 10 0 parts of copper particles having a mean particle size of 0.5 $\mu$m, 35 parts of an organic vehicle (obtained by dissolving 8 parts by weight of ethyl cellulose resin in 92 parts of butylcarbinol), and 7 parts of butylcarbinol.

Using the dielectric layer-forming paste and the internal electrode layer-forming paste, multilayer ceramic chip capacitors of the configuration shown in the FIGURE were fabricated.

First the dielectric layer-forming paste was applied to PET film to form a green sheet, onto which the internal electrode layer-forming paste was printed. The green sheet was separated from the PET film. A number of such green sheets were stacked and bonded under pressure to form a green chip. The laminated chip had 96 active layers (with electrodes) and 10 cover layers for the purpose of insulation. After cutting to a predetermined size, the binder was removed from the green chip, and the chip was subsequently fired, and annealed under the following conditions to form a capacitor chip.

Binder Removal
  Heating rate: 10° C./hour
  Holding temperature: 280° C.
  Atmospheric gas: air
Firing
  Heating rate: 120° C./hour
  Holding temperature: 1315° C.
  Holding time: 3 hours
  Cooling rate: 120° C./hour
  Atmospheric gas: humidified $N_2/H_2$
  Oxygen partial pressure: $10^{-8}$ atm.
Annealing
  Holding temperature: 1000° C.
  Holding time: 6 hours
  Cooling rate: 120° C./hour
  Atmospheric gas: $N_2$/air with 0–200 ppm $O_2$
  Oxygen partial pressure: $10^{-5}$ atm.

For humidifying the atmospheric gases, a wetter was used at a water temperature of 35° C.

The chip thus-obtained was polished at end faces by sand blasting. The external electrode-forming paste was transferred to the end faces and fired in a humid $N_2$ +$H_2$ gas atmosphere at 850° C. for 60 minutes to form external electrodes. The dimensions of the resulting capacitor samples were 3.2 mm×1.6 mm×1.2 mm. The dielectric layers were 9 μm thick, and the internal electrodes were 2 μm thick. Table 1 summarizes the electrical properties of the ceramic capacitors thus-formed.

TABLE 1

| | | | | Capacitor Performance | | | | |
|---|---|---|---|---|---|---|---|---|
| Cap (ηF) | K @ 25° C. | DF (%) | 25° C. IR (GΩ) | 125° C. IR (GΩ) | −55° C. TCC (%) | 125° C. TCC (%) | UVBD (volts) | HALT failures* |
| 995 ± 15 | 2900 | 1.89 ± 0.02 | 7.5 ± 0.5 | 0.76 ± 0.04 | −9.88 | −14.90 | 737 ± 97 | 0/50 |

*HALT test conditions: 60 hours, 140° C., 224 volts (14 × rated voltage).

"UVBD," the ultimate voltage breakdown, represents the averaged voltage at which the chips failed. The samples had a dielectric constant (K) of at least 2500 at 25° C. and a dissipation factor (DF) of less than 3.5% (measured at 1 volt RMS) at 25° C. The samples did not exhibit dielectric breakdown when subjected to highly accelerated life testing, consisting of application of DC voltage between 8 and 14 times the rated voltage of the ceramic at 140° C. for a period of 16–60 hours. Under these highly stressed conditions, the ceramic capacitors maintained high insulation resistance (IR) and did not exhibit dielectric breakdown during up to 60 hours of testing.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A multilayer ceramic chip capacitor comprising alternately stacked, fired dielectric layers and internal electrode layers, the dielectric layers comprising:
  $BaTiO_3$: 94 to 99 mol %;
  $CaTiO_3$: 0.1 to 4 mol %;
  BaO: 0.1 to 2 mol %;
  CaO: 0 to 1 mol %;
  SrO: 0 to 1 mol %;
  $SiO_2$: 0.1 to 5 mol %;
  $MnO_2$: 0.01 to 2 mol %;
  $Y_2O_3$: 0.1 to 3 mol %; and
  CoO: 0.01 to 1 mol %;
wherein the dielectric layers are free of magnesium oxide.

2. The multilayer ceramic chip capacitor of claim 1 wherein the $SiO_2$ and a portion of the BaO, CaO, and $CaTiO_3$ are present in the dielectric layers in the form of a glass flux.

3. The multilayer ceramic chip capacitor of claim 1 wherein the internal electrode layers contain a conductor in the form of nickel or nickel alloy.

4. The multilayer ceramic chip capacitor of claim 1 wherein the dielectric layers comprise:
  $BaTiO_3$: 95 to 97 mol %;
  $CaTiO_3$: 1 to 3 mol %;
  BaO: 0.25 to 1.25 mol %;
  CaO: 0.01 to 0.5 mol %;
  SrO: 0 to 0.5 mol %;
  $SiO_2$: 1 to 3 mol %;
  $MnO_2$ 0.05 to 0.5 mol %;
  $Y_2O_3$: 0.2 to 2 mol %; and
  CoO: 0.03 to 0.25 mol %.

5. The multilayer ceramic chip capacitor of claim 4 wherein the $SiO_2$ and a portion of the BaO, CaO, and $CaTiO_3$ are present in the dielectric layers in the form of a glass flux.

6. The multilayer ceramic chip capacitor of claim 4 wherein the internal electrode layers contain a conductor in the form of nickel or nickel alloy.

7. A process for making a multilayer ceramic chip capacitor comprising alternately stacked, fired dielectric layers and internal electrode layers, wherein the dielectric layers are formed from a dielectric material comprising barium titanate as a major component and calcium titanate, barium oxide or a precursor thereof, calcium oxide or a precursor thereof, strontium oxide or a precursor thereof, silicon dioxide or a precursor thereof, manganese dioxide or a precursor thereof, yttrium oxide or a precursor thereof, and cobalt oxide or a precursor thereof as minor components in such proportions that there are present:
  $BaTiO_3$: 94 to 99 mol %;
  $CaTiO_3$: 0.1 to 4 mol %;
  BaO: 0.1 to 2 mol %;
  CaO: 0 to 1 mol %;

SrO: 0 to 1 mol %;
SiO$_2$: 0.1 to 5 mol %;
MnO$_2$: 0.01 to 2 mol %;
Y$_2$O$_3$: 0.1 to 3 mol %; and
CoO: 0.01 to 1 mol %;
wherein the dielectric material is free of magnesium oxide, the process comprising:
(a) forming a green chip by stacking alternating layers of said dielectric material and an internal electrode material; and
(b) firing the green chip to form a multilayer ceramic chip capacitor.

8. The process of claim 7 further comprising annealing the multilayer ceramic chip capacitor.

9. The process of claim 8 wherein said internal electrode material contains a conductor in the form of nickel or nickel alloy.

10. The process of claim 8 wherein the dielectric material comprises:

BaTiO$_3$: 95 to 97 mol %;
CaTiO$_3$: 1 to 3 mol %;
BaO: 0.25 to 1.25 mol %;
CaO: 0.01 to 0.5 mol %;
SrO: 0 to 0.5 mol %;
SiO$_2$: 1 to 3 mol %;
MnO$_2$: 0.05 to 0.5 mol %;
Y$_2$O$_3$: 0.2 to 2 mol %; and
CoO: 0.03 to 0.25 mol %.

11. The process of claim 10 further comprising annealing the multilayer ceramic chip capacitor.

12. The process of claim 10 wherein said internal electrode material contains a conductor in the form of nickel or nickel alloy.

* * * * *

UNITED STATES PATENT AND TRADEMARK OFFICE
CERTIFICATE OF CORRECTION

PATENT NO.   : 6,185,087 B1
DATED        : February 6, 2001
INVENTOR(S)  : Hyun D. Park et al.

It is certified that error appears in the above-identified patent and that said Letters Patent is hereby corrected as shown below:

Column 10,
Line 32, "MnO20.05" has been replaced with -- MnO$_2$: 0.05 --.

Signed and Sealed this

Eighth Day of July, 2003

JAMES E. ROGAN
*Director of the United States Patent and Trademark Office*